United States Patent
Choi et al.

(10) Patent No.: US 11,851,797 B2
(45) Date of Patent: Dec. 26, 2023

(54) WASHING MACHINE AND CONTROL METHOD THEREFOR

(71) Applicant: SAMSUNG ELECTRONICS CO., LTD., Suwon-si (KR)

(72) Inventors: Jun-hoe Choi, Hwaseong-si (KR); Tae-gyoon Noh, Suwon-si (KR); Seo-ho Lee, Seongnam-si (KR); Jeong-su Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 16/646,426

(22) PCT Filed: Aug. 29, 2018

(86) PCT No.: PCT/KR2018/009992
§ 371 (c)(1),
(2) Date: Mar. 11, 2020

(87) PCT Pub. No.: WO2019/050211
PCT Pub. Date: Mar. 14, 2019

(65) Prior Publication Data
US 2020/0277721 A1    Sep. 3, 2020

(30) Foreign Application Priority Data
Sep. 11, 2017  (KR) .......................... 10-2017-0115766

(51) Int. Cl.
*D06F 33/47* (2020.01)
*D06F 33/38* (2020.01)
(Continued)

(52) U.S. Cl.
CPC .............. *D06F 33/36* (2020.02); *D06F 33/38* (2020.02); *D06F 33/47* (2020.02); *D06F 34/22* (2020.02);
(Continued)

(58) Field of Classification Search
CPC .......... D06F 33/36; D06F 33/38; D06F 33/47; D06F 34/22; D06F 33/32; D06F 2103/20;
(Continued)

(56) References Cited

U.S. PATENT DOCUMENTS 9,709,505 B2    7/2017  Choi et al.
2008/0128001 A1    6/2008  Kennichi et al.
(Continued)

FOREIGN PATENT DOCUMENTS

CH          704722         8/2012
DE      102004057957      6/2006
(Continued)

OTHER PUBLICATIONS https://www.sciencelearn.org.nz/resources/47-colours-of-light (Year: 2017).*

(Continued)

*Primary Examiner* — Michael E Barr
*Assistant Examiner* — Pallavi Chitta
(74) *Attorney, Agent, or Firm* — STAAS & HALSEY LLP

(57) ABSTRACT

A washing machine and a control method therefor are disclosed. The washing machine comprises: a sensor for emitting white light, which includes infrared (IR) light, at washing water and receiving, from the white light emitted at the washing water, visible light of a specific wavelength and infrared light of a specific wavelength, which are reflected by the washing water or penetrate the washing water; and a processor for determining turbidity and the color of the washing water on the basis of the intensity and patterns of the visible light and the infrared light of the specific wavelengths, which are received from the sensor, and controlling an operation of the washing machine on the basis of the turbidity and the color of the washing water.

9 Claims, 13 Drawing Sheets

(51) Int. Cl.
  G01N 21/3577 (2014.01)
  D06F 33/36 (2020.01)
  D06F 34/22 (2020.01)
  *D06F 103/64* (2020.01)
  *D06F 103/20* (2020.01)
  *D06F 105/62* (2020.01)
  *D06F 105/52* (2020.01)
  *D06F 105/58* (2020.01)
  *D06F 33/32* (2020.01)

(52) U.S. Cl.
  CPC ......... *G01N 21/3577* (2013.01); *D06F 33/32* (2020.02); *D06F 2103/20* (2020.02); *D06F 2103/64* (2020.02); *D06F 2105/52* (2020.02); *D06F 2105/58* (2020.02); *D06F 2105/62* (2020.02); *G01N 2201/062* (2013.01)

(58) Field of Classification Search
  CPC ............ D06F 2103/64; D06F 2105/52; D06F 2105/58; D06F 2105/62; D06F 2103/22; G01N 21/3577; G01N 2201/062; G01N 2015/0053; G01N 2015/0693; G01N 15/06; G01N 21/27; G01N 21/51
  See application file for complete search history.

(56) References Cited

U.S. PATENT DOCUMENTS

2009/0278048 A1* 11/2009 Choe ................ H01L 27/14652
  250/339.05
2013/0278921 A1* 10/2013 Choi ................... G01N 21/534
  356/51

FOREIGN PATENT DOCUMENTS

| EP | 2657687 | | | 10/2013 |
|---|---|---|---|---|
| JP | 2011-200526 | | | 10/2011 |
| JP | 2014-54403 | | | 3/2014 |
| KR | 2003-0049823 | | | 6/2003 |
| KR | 10-2005-0066439 | | | 6/2005 |
| KR | 20050066439 | A | * | 6/2005 |
| KR | 20050066439 | A | * | 6/2005 |
| KR | 10-2008-0051369 | | | 6/2008 |
| KR | 10-2013-0119357 | | | 10/2013 |
| KR | 20130119357 | A | * | 10/2013 |
| KR | 20130119357 | A | * | 10/2013 |
| KR | 10-1406884 | | | 6/2014 |

OTHER PUBLICATIONS

Examination Report dated May 7, 2021 for European Patent Application No. 18854720.2.
International Search Report dated Dec. 11, 2018, in corresponding International Patent Application No. PCT/KR2018/009992.
Written Opinion of the International Searching Authority dated Dec. 11, 2018, in corresponding International Patent Application No. PCT/KR2018/009992.
European Communication dated Nov. 23, 2020 in European Patent Application No. 188547202
Extended European Search Report dated Jun. 30, 2020 in European Patent Application No. 18854720.2.
Korean Office Action for Korean Patent Application No. 10-2017-0115766 dated Nov. 13, 2021.
Office Action dated May 30, 2022 in Korean Patent Application No. 10-2017- 0115766.

* cited by examiner

WASHING MACHINE AND CONTROL METHOD THEREFOR

CROSS-REFERENCE TO RELATED APPLICATIONS

This application is a U.S. National Stage Application which claims the benefit under 35 U.S.C. § 371 of International Patent Application No. PCT/KR2018/009992 filed on Aug. 29, 2018, which claims foreign priority benefit under 35 U.S.C. § 119 of Korean Patent Application No. 10-2017-0115766 filed on Sep. 11, 2017 in the Korean Intellectual Property Office, the contents of both of which are incorporated herein by reference.

TECHNICAL FIELD

The disclosure relates to a washing machine and a control method therefor, and more particularly, to a washing machine controlling a washing operation based on a condition of washing water and a control method therefor.

BACKGROUND ART

A washing machine is an electronic device automatically washing laundry and may wash the laundry by putting washing water into a main body and then stirring washing water and the laundry.

Meanwhile, in a process of washing the laundry, a dye transfer may occur due to a discoloration of the laundry. In this case, a conventional washing machine performs its washing operation as it is even in case that the dye transfer already occurs, and may thus damage even another laundry in the washing machine.

Meanwhile, the conventional washing machine performs the washing operation according to a washing method set by a user.

In this case, even in case that a contamination degree of the laundry is severe and the laundry can not be properly washed only by the washing method set by the user, the washing machine performs only the washing operation according to the method set by the user, thereby preventing the laundry from being properly washed.

DISCLOSURE

Technical Problem

The disclosure provides a washing machine capable of performing an additional washing operation in case that a contamination degree of washing water is severe and performing a dye transfer prevention operation in case that color change of the washing water is detected, and a control method therefor.

Technical Solution

According to an embodiment of the disclosure, a washing machine may include: a sensor configured to emit white light including infrared (IR) light to washing water and receive visible light of a specific wavelength and infrared light of a specific wavelength which are reflected by the washing water or transmitted through the washing water among the white light emitted to the washing water; and a processor configured to determine turbidity value and color of the washing water based on intensity and patterns of the visible and infrared light of the specific wavelengths which are received from the sensor and control an operation of the washing machine based on the turbidity and color of the washing water.

In addition, the sensor may include: a light emitter configured to emit the white light including the infrared light to the washing water; and a light receiver configured to simultaneously receive the visible and infrared light of the specific wavelengths among the white light emitted to the washing water.

In addition, the processor may be configured to determine color and concentration grade of the washing water on the basis of the intensity and pattern of the visible light of the specific wavelength which is received from the light receiver and control the washing machine to perform a dye transfer prevention operation in case that the color of the washing water has a grade equal to or higher than a predetermined concentration grade.

In addition, the processor may be configured to determine the turbidity value of the washing water on the basis of the intensity and patterns of the visible and infrared light of the specific wavelengths which are received from the light receiver and control the washing machine to perform an additional washing operation in case that the turbidity value of the washing water is equal to or greater than a predetermined turbidity value.

Here, the dye transfer prevention operation may be at least one of: an operation for providing feedback on occurrence of dye transfer to a user; an operation for preventing spread of the dye transfer; or an operation for ending a washing operation.

In addition, the processor may be configured to determine the turbidity and color of the washing water while the washing machine performs at least one of a preliminary washing operation or the washing operation.

In addition, in case that a detergent is put into the washing machine, the processor may be configured to determine the color and turbidity of the washing water in which the detergent is diluted, and control the operation of the washing machine on the basis of the turbidity and color of the washing water in which the detergent is diluted.

In addition, the processor may be configured to determine turbidity and color of rinsing water while a rinsing operation is performed, and control the washing machine to perform an additional rinsing operation on the basis of the turbidity and color of the rinsing water.

In addition, the light receiver may be configured to simultaneously receive the visible and infrared light of the specific wavelengths and perform a multi-wave detection.

Meanwhile, a control method for a washing machine according to an embodiment of the disclosure may include: emitting white light including infrared (IR) light to washing water and receiving visible light of a specific wavelength and infrared light of a specific wavelength, which are reflected by the washing water or transmitted through the washing water among the white light emitted to the washing water; and determining turbidity value and color of the washing water based on intensity and patterns of the received visible and infrared light of the specific wavelengths and controlling an operation of the washing machine based on the turbidity value and color of the washing water.

In addition, in the receiving of the visible light of the specific wavelength and the infrared light of the specific wavelength, the visible light of the specific wavelength and the infrared light of the specific wavelength may be simultaneously received among the white light emitted to the washing water.

In addition, in the controlling of the operation of the washing machine, color and concentration grade of the washing water may be determined on the basis of the intensity and pattern of the received visible light of the specific wavelength, and a dye transfer prevention operation may be performed in case that the color of the washing water has a grade equal to or higher than a predetermined concentration grade.

In addition, in the controlling of the operation of the washing machine, the turbidity value of the washing water may be determined on the basis of the intensity and patterns of the received visible and infrared light of the specific wavelengths, and an additional washing operation may be performed in case that the turbidity value of the washing water is equal to or higher than a predetermined level.

Here, the dye transfer prevention operation may be at least one of: an operation for providing feedback on occurrence of dye transfer to a user; an operation for preventing spread of the dye transfer; or an operation for ending a washing operation.

In addition, in the determining of the turbidity and color of the washing water, the turbidity and color of the washing water may be determined while the washing machine performs at least one of a preliminary washing operation or the washing operation.

In addition, in the controlling of the operation of the washing machine, in case that a detergent is put into the washing machine, the color and turbidity of the washing water in which the detergent is diluted may be determined and the operation of the washing machine on the basis of the turbidity and color of the washing water in which the detergent is diluted may be controlled.

In addition, the control method for a washing machine may further include determining turbidity and color of rinsing water while a rinsing operation is performed and controlling the washing machine to perform an additional rinsing operation on the basis of the turbidity and color of the rinsing water.

In addition, in the receiving of the visible light of the specific wavelength and the infrared light of the specific wavelength, the visible and infrared light of the specific wavelengths may be simultaneously received and a multi-wave detection may be performed.

Advantageous Effects

As seen above, according to the various embodiments of the disclosure, the washing machine may control the operation of the washing machine in consideration of the turbidity and color of the washing water through the sensor capable of simultaneously receiving the visible and infrared light of the specific wavelengths. Accordingly, the user may prevent laundry damage due to the dye transfer of the laundry, and even in case that the laundry is severely contaminated, the user may be provided with laundry completely washed by the additional washing operation.

BEST MODE

Mode

Figure 1:
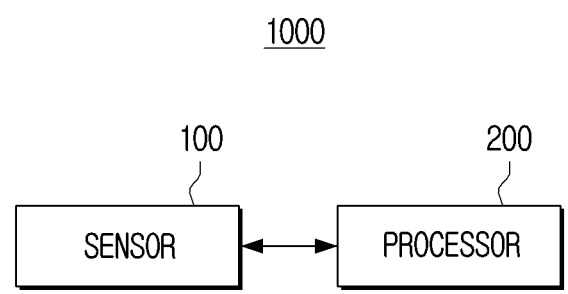
FIG. 1 is a block diagram for describing a washing machine according to an embodiment of the disclosure.

The disclosure may be variously modified and may have several embodiments, and thus specific embodiments of the disclosure are illustrated in the drawings and described in detail in the detailed description. However, it is to be understood that the disclosure is not limited to specific embodiments, but includes all modifications, equivalents and substitutions without departing from the scope and spirit of the disclosure. If it is decided that a detailed description for the known art related to the disclosure may obscure the gist of the disclosure, the detailed description is omitted.

Terms 'first', 'second' and the like, may be used to describe various components, but the components are not to be construed as being limited by the terms. The terms are used only to distinguish one component from another component.

Terms used in the disclosure are used only to describe specific embodiments rather than limiting the scope of the disclosure. Singular forms used herein are intended to include plural forms unless explicitly indicated otherwise. It is further understood that a term "include" or "formed of" used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In embodiments, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor (not shown) except for a 'module' or an '~er/or' that needs to be implemented by specific hardware.

Hereinafter, the disclosure is described in detail with reference to the accompanying drawings.

FIG. 1 is a block diagram for describing a washing machine according to an embodiment of the disclosure.

Referring to FIG. 1, a washing machine 1000 according to an embodiment of the disclosure may include a sensor 100 and a processor 200.

The sensor 100 may emit light to washing water and receive the light emitted to the washing water.

To this end, the sensor 100 may be installed at a position where the washing water is present in the washing machine 1000. For example, the sensor 100 may be installed at a lower portion of a tub (not shown) of the washing machine 1000, i.e. in a region where the washing water is accumulated. However, the sensor 100 is not limited to this position, and may be installed in various regions in which the sensor 100 may emit light to the washing water and receive the light emitted to the washing water.

In detail, the sensor 100 may emit white light including infrared (IR) light to the washing water. In addition, the sensor 100 may emit ultraviolet light as necessary. To this end, the sensor 100 may be implemented as a light emitting diode (LED) capable of emitting the white light including the infrared light. The sensor 100 may also be implemented as each of a visible light LED for emitting visible light and an infrared LED for emitting the infrared light. In addition, the sensor 100 may further include an ultraviolet LED as necessary.

In addition, the sensor 100 may receive visible light of a specific wavelength and infrared light of a specific wavelength, which are reflected by the washing water or transmitted through (or penetrate) the washing water, among the white light including the infrared light emitted to the washing water. In detail, the sensor 100 may receive the visible and infrared light of specific wavelengths by reflecting or filtering visible and infrared light of the remaining wavelengths except for the visible and infrared light of the specific wavelengths among the white light including the infrared light emitted to the washing water. This configuration is described in more detail with reference to FIGS. 2 and 3.

In addition, the sensor 100 may convert the received visible and infrared light of the specific wavelengths into electrical signals and output the electrical signals.

Here, the electrical signal output from the sensor 100 may have different magnitude. In detail, the electrical signal output from the sensor 100 may have different magnitude based on amount of light received from the sensor 100.

Accordingly, the electrical signal output from the sensor 100 may include information on a wavelength of the received light and information on the amount of light.

A processor 200 may control an overall operation of the washing machine 1000.

In particular, the processor 200 may control the operation of the washing machine based on the electrical signal output from the sensor 100. In detail, the processor 200 may control the operation of the washing machine based on the information on the wavelength of light and the information on the amount of light, included in the electrical signal output from the sensor 100.

In more detail, the processor 200 may determine intensity and patterns of the visible and infrared light of the specific wavelengths, which are received from the sensor 100, based on the information on the wavelength of light and the information on the amount of light; determine turbidity and color of the washing water on a basis thereof; and control the operation of the washing machine based on the determined turbidity and color of the washing water.

For example, the processor 200 may control the washing machine 1000 to perform a dye transfer prevention operation if it is determined that the laundry in the washing machine 1000 is discolored, and may control the washing machine 1000 to perform an additional washing operation if it is determined that a contamination degree of the laundry is severe, on the basis of the turbidity and color of the washing water. In addition, if it is determined that the laundry is not properly washed in a rinsing process, the processor 200 may control the washing machine 1000 to perform an additional rinsing operation.

Hereinafter, referring to FIGS. 2 through 5, the description focuses on the sensor 100 according to an embodiment of the disclosure in more detail and an operation of the processor 200 for controlling the operation of the washing machine 1000 based on the electrical signal output from the sensor 100.

Figure 2:
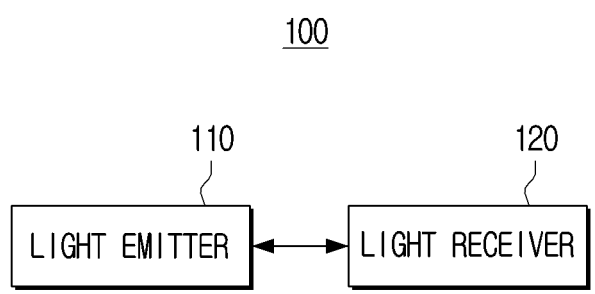
FIG. 2 is a block diagram for describing a sensor according to an embodiment of the disclosure.

FIG. 2 is a block diagram for describing a sensor according to an embodiment of the disclosure.

Referring to FIG. 2, the sensor 100 may include a light emitter 110 and a light receiver 120.

The light emitter 110 may emit light to the washing water. In detail, the light emitter 110 may emit the white light including the infrared (IR) light to the washing water. In addition, the light emitter 110 may emit the ultraviolet light as necessary.

To this end, light emitter 110 may be implemented as the light emitting diode (LED) capable of emitting the white light including the infrared light. The light emitter 110 may also be implemented as each of the LED for emitting the visible light and the LED for emitting the infrared light, as necessary. In addition, the light emitter 110 may further include the ultraviolet LED as necessary.

The light receiver 120 may receive the white light including the infrared light emitted from the light emitter 110 to the washing water. In detail, the light receiver 120 may simultaneously receive the visible light of the specific wavelength and the infrared light of the specific wavelength, which are reflected by the washing water or transmitted through the washing water, among the white light including the infrared light emitted from the light emitter 110 to the washing water.

In more detail, the light receiver 120 may simultaneously receive the visible and infrared light of the specific wavelengths by reflecting or filtering the visible and infrared light of the remaining wavelengths except for the visible and infrared light of the specific wavelengths among the white light including the infrared light emitted from the light emitter 110 to the washing water.

For example, in case that the light emitter 110 emits the white light including the infrared light to the washing water, the light receiver 120 may receive: visible light of a 580 nm wavelength corresponding to a red wavelength band; visible light of a 545 nm wavelength corresponding to a green wavelength band; and visible light of a 440 nm wavelength corresponding to a blue wavelength band, among the visible light wavelengths. In addition, the light receiver 120 may simultaneously receive infrared light of a 940 nm wavelength among the infrared wavelengths.

As such, the light receiver 200 may simultaneously receive the visible and infrared light of the specific wavelengths and perform a multi-wave detection. To this end, the light receiver 200 may be configured by overlapping a plurality of layers (or filters). This configuration is described with reference to FIG. 3.

Figure 3:
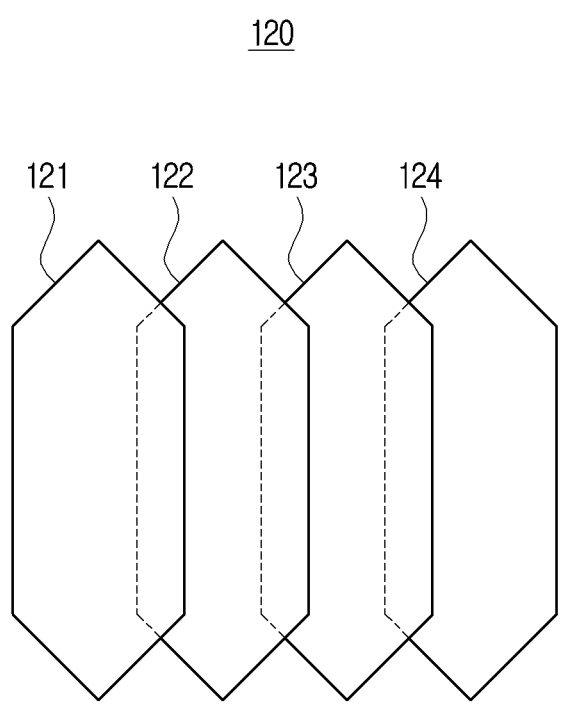
FIG. 3 is a view for describing a light receiver configured to include a plurality of layers according to an embodiment of the disclosure.

FIG. 3 is a view for describing a light receiver configured to include a plurality of layers according to an embodiment of the disclosure.

Referring to FIG. 3, the light receiver 200 according to an embodiment of the disclosure may be configured by overlapping four layers.

Here, a first layer 121 may be a layer for receiving the visible light corresponding to the red wavelength band; a second layer 122 may be a layer for receiving the visible light corresponding to the green wavelength band; a third layer 123 may be a layer for receiving the visible light corresponding to the blue wavelength band; and a fourth layer 124 may be a layer for receiving the infrared light of the specific wavelength band.

In detail, the first layer 121 may receive the visible light of the 580 nm wavelength corresponding to the red wavelength band and reflect or filter light of the remaining wavelength band, among the white light including the infrared light emitted from the light emitter 110 to the washing water. In addition, the second layer 122 may receive the visible light of the 545 nm wavelength corresponding to the green wavelength band and reflect or filter light of the remaining wavelength band, among the white light including the infrared light emitted from the light emitter 110 to the washing water. In addition, the third layer 123 may receive the visible light of the 440 nm wavelength corresponding to the blue wavelength band and reflect or filter light of the remaining wavelength band, among the white light including the infrared light emitted from the light emitter 110 to the washing water. In addition, the fourth layer 124 may receive the infrared light of the 940 nm wavelength and reflect or filter light of the remaining wavelength band, among the white light including the infrared light emitted from the light emitter 110 to the washing water.

Accordingly, the light receiver 200 may receive both visible light corresponding to the red wavelength band, the green wavelength band and the blue wavelength band and the infrared light of the specific wavelength band, among the white light including the infrared light emitted from the light emitter 110.

Meanwhile, FIG. 3 shows that the light receiver 120 is configured by overlapping the four layers, but this configuration is only an example. In some cases, the light receiver 120 may be implemented to have four or more layers, or may be implemented to have fewer than four layers.

Figure 4:
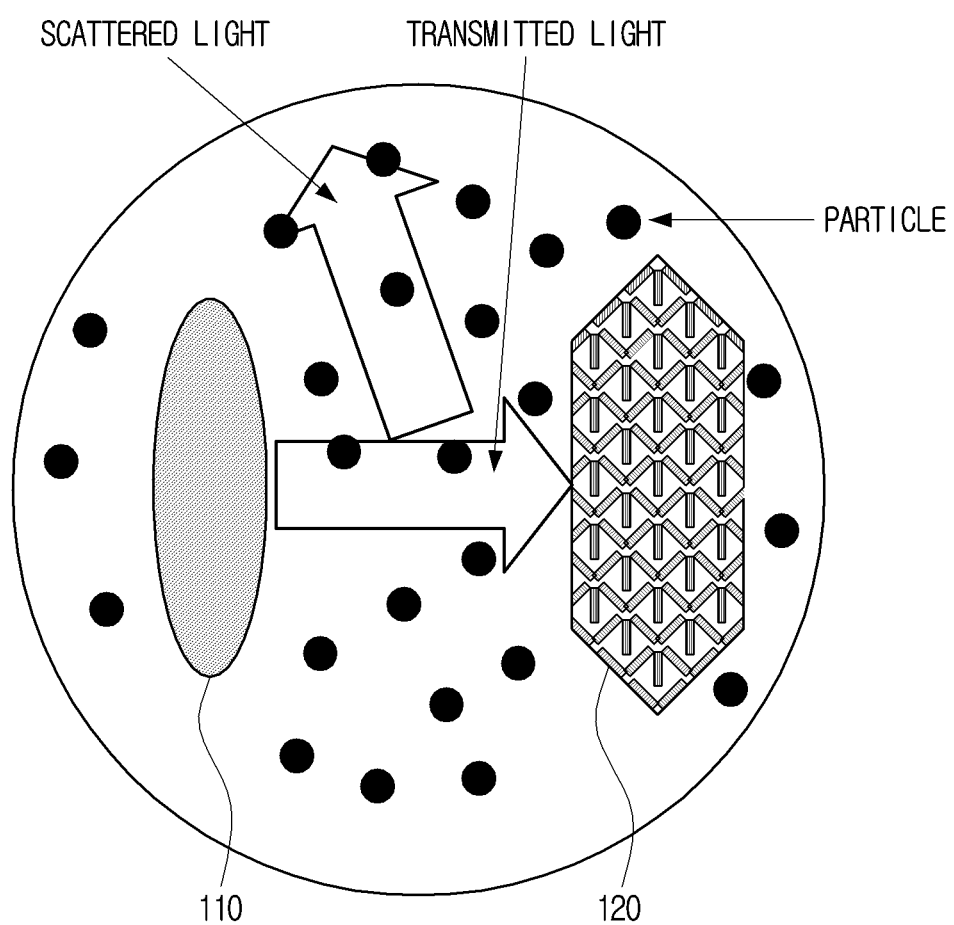
FIG. 4 is a view for describing an operation process of the sensor according to an embodiment of the disclosure.

FIG. 4 is a view for describing an operation process of the sensor according to an embodiment of the disclosure.

Referring to FIG. 4, the light emitter 110 and the light receiver 120 may be implemented to face each other. This configuration may allow the light receiver 120 to receive the light emitted from the light emitter 110. However, the light emitter 110 and the light receiver 120 may not be necessarily implemented to have the form as shown in FIG. 4, and may be disposed in various forms. In addition, FIG. 4 shows that the light emitter 110 and the light receiver 120 are configured as different hardware. However, in some cases, the light emitter 110 and the light receiver 120 may be included in a single hardware.

The light emitter 110 may emit the white light including the infrared light to the washing water. As described above, in some cases, the light emitter 110 may emit the ultraviolet light to the washing water.

In addition, the white light including the infrared light emitted from the light emitter 110 may be reflected or scattered by particles present in the washing water and thus not reach the light receiver 120, or reach the light receiver 120 by passing through the particles in the washing water.

The light emitted from the light emitter 110 may reach the light receiver 120 after being reflected by the particles present in the washing water.

In addition, the light receiver 120 may receive the visible and infrared light of the specific wavelengths among the lights reaching the light receiver 120. This configuration is already described above, and thus its description is omitted here.

Meanwhile, the light receiver 120 may convert the received visible light and infrared light into the electrical signals and output the electrical signals. Here, the electrical signal may further include the information on the amount of received light. In detail, in case that there are a large number of particles having high turbidity in the washing water, light is scattered or absorbed by the particles, such that small amount of light reaches the light receiver 120. Accordingly, the light receiver 120 may output an electric signal having smaller magnitude. On the contrary, in case that there are a small number of particles having high turbidity in the washing water, large amount of light may reach the light receiver 120. Accordingly, the light receiver 200 may output an electrical signal having larger magnitude.

An example of the electrical signal output from the light receiver 120 is described with reference to FIG. 5.

Figure 5:
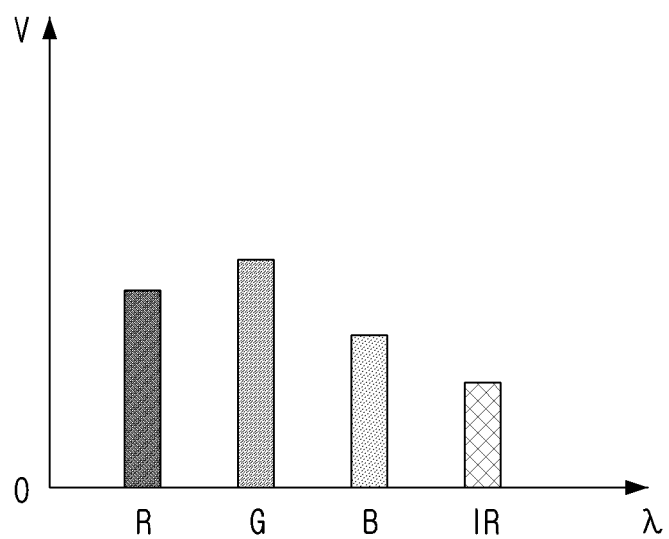
FIG. 5 is a view for describing an electrical signal output from the light receiver according to an embodiment of the disclosure.

FIG. 5 is a view for describing an electrical signal output from the light receiver according to an embodiment of the disclosure.

As described in FIG. 3, the light receiver 120 may be configured to include the four layers.

In this case, the light receiver 120 may receive the visible light of the 580 nm wavelength corresponding to the red wavelength band, the visible light of the 545 nm wavelength corresponding to the green wavelength band and the visible light of the 440 nm wavelength corresponding to the blue wavelength band, among the white light including the infrared light, and may also receive the infrared light of the 940 nm wavelength among the infrared light.

Accordingly, the electrical signal output from the light receiver 120 may be as shown in FIG. 5. In detail, the light receiver 120 may receive the visible light corresponding to the specific wavelengths, i.e. the visible light corresponding to the red wavelength band, the visible light corresponding to the green wavelength band, and the visible light corresponding to the blue wavelength band. The light receiver 120 may output the electrical signal having different magnitude based on the amount of light included in the visible light of each wavelength. Similarly, it is possible to receive the infrared light of the specific wavelength and output the electrical signal having different magnitude based on the amount of light included in the infrared light.

Meanwhile, FIG. 5 shows that the light receiver 120 is configured to include the four layers to output electrical signals corresponding to the four wavelengths. However, the light receiver 120 may be configured to include four or more layers or four or less layers to output electrical signals corresponding to four or more or four or less wavelengths.

Hereinafter, the description specifically focuses on a method of the processor 200 for determining the turbidity and color of the washing water based on the electrical signal output from the light receiver 120 and for controlling the operation of the washing machine based thereon.

In addition, hereinafter, the description, for example, focuses on a case in which the light receiver 120 receives the visible light of the 580 nm wavelength corresponding to the red wavelength band, the visible light of the 545 nm wavelength corresponding to the green wavelength band, the visible light of the 440 nm wavelength corresponding to the blue wavelength band and the infrared light of the 940 nm wavelength among the infrared wavelengths.

Figure 6:
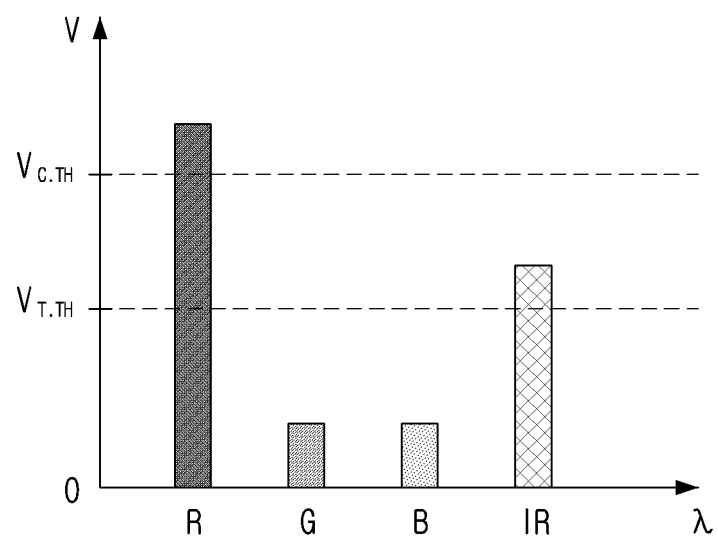
FIG. 6 is a view for describing that the washing machine is controlled to perform a dye transfer prevention operation.

FIG. 6 is a view for describing that the washing machine is controlled to perform a dye transfer prevention operation.

The processor 200 may determine the color of the washing water based on the visible light of the specific wavelength, which is received from the light receiver 120.

In detail, the processor 200 may determine the intensity and pattern of the received visible light based on the wavelength and the amount of the visible light received from the light receiver 120, and may determine color and concentration grade of the washing water based thereon.

For example, in case that red-based clothes in the washing machine are discolored and the particles in the washing water are thus red-based, the light receiver 120 may receive a large amount of the visible light of the 580 nm wavelength corresponding to the red wavelength band. Accordingly, the light receiver 120 may output an electrical signal having a pattern with higher intensity in the red wavelength band compared to the visible light in the other wavelength bands.

In this case, the processor 200 may determine the color of the washing water on the basis of the intensity and pattern of the visible light. As described above, in case that there is output the electrical signal having the pattern with the higher intensity in the red wavelength band as compared to the visible light in the other wavelength bands, the processor 200 may determine that the washing water is red-based.

In addition, the processor 200 may determine the concentration grade of the washing water on the basis of the intensity and pattern of the visible light. To this end, the washing machine 1000 may store the plurality of concentration grades by dividing the grades based on predetermined criteria. For example, the plurality of concentration grades may be stored by being divided into zero to 5 levels according to an order of increased concentration of the color of the washing water. That is, the plurality of concentration grades may be stored by being divided into a plurality of levels in proportion to the magnitude of the electrical signals output from the sensor 100. As described above, in case that there is output the electrical signal having the pattern with higher intensity in the red wavelength band, the processor 200 may determine that the washing water has a higher concentration grade in the red color series than in the other color series.

In addition, in case that the color of the washing water has a grade equal to or higher than a predetermined concentration grade, the processor 200 may control the washing machine 1000 to perform the dye transfer prevention operation. That is, if it is determined that the magnitude of the electrical signal output from the light receiver 120 is equal to or larger than the predetermined magnitude, the processor 200 may control the washing machine 1000 to perform the dye transfer prevention operation.

For example, in case that 3 is the predetermined concentration grade of the washing machine 1000 and if it is determined that the color of the washing water has a concentration grade equal to or higher than 3, the processor 200 may control the washing machine 1000 to perform the dye transfer prevention operation. That is, in case that the magnitude of the electrical signal output from the light receiver 120 is larger than the electrical signal corresponding to the concentration grade 3, the processor 200 may determine that the dye transfer occurs in the washing water. Meanwhile, the predetermined concentration grade may be set not only at a time at which a product is manufactured, but also by the user.

For example, referring to FIG. 6, in case that the light receiver 120 outputs an electrical signal larger than an electrical signal Vc,TH having magnitude corresponding to the predetermined concentration grade (concentration grade 3) in the red wavelength band, the processor 200 may determine that the dye transfer occurs in the washing water.

In this case, the processor 200 may control the washing machine to perform the dye transfer prevention operation. Here, the dye transfer prevention operation may be at least one of: an operation for providing feedback on occurrence of dye transfer to the user; an operation for preventing spread of the dye transfer; or an operation for ending a washing operation. For example, the processor 200 may provide feedback in various ways, such as outputting a warning sound that the dye transfer occurs through a speaker (not shown) of the washing machine or outputting a message indicating that the dye transfer occurs through a display (not shown) of the washing machine, and may end the washing operation. Here, the end of the washing operation may be an operation for draining the washing water.

Meanwhile, FIG. 6 shows that the electrical signal corresponding to magnitude of the concentration grade higher than the predetermined concentration grade is output in the red wavelength band, but this case is only an example. The same idea of the present art may be applied to the green wavelength band and the blue wavelength band.

Figure 7:
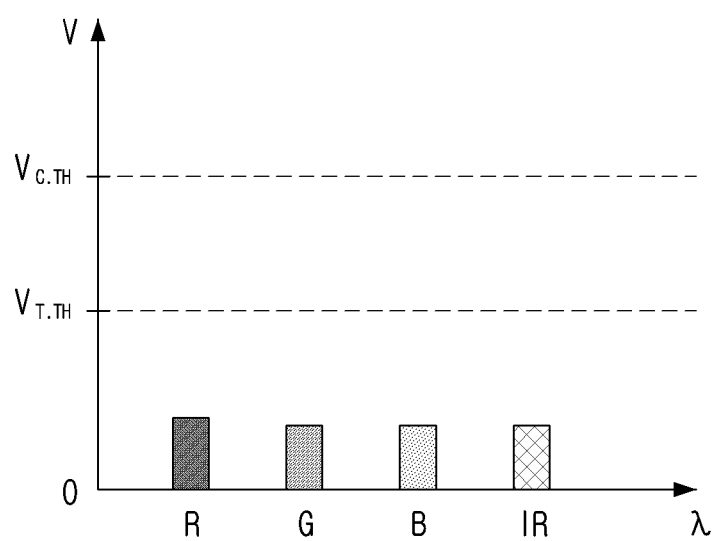
FIG. 7 is a view for describing that the washing machine is controlled to perform an additional washing operation.

FIG. 7 is a view for describing that the washing machine is controlled to perform an additional washing operation.

The processor 200 may determine a turbidity value of the washing water, i.e. the contamination degree of the washing water, on the basis of the intensity and patterns of the visible and infrared light of the specific wavelengths, which are received from the light receiver 120.

For example, in case that the laundry in the washing machine is severely contaminated, a plurality of particles having high turbidity may be included in the washing water. In this case, the light receiver 120 may receive small amount of visible and infrared light except for the visible and infrared light scattered or absorbed by the plurality of particles having high turbidity. Accordingly, the light receiver 120 may output an electrical signal having small magnitude.

In addition, in case that a turbidity value of the washing water is equal to or greater than a predetermined turbidity value, i.e. if it is determined that the magnitude of the electrical signal output from the light receiver 120 is equal to or higher than a predetermined level, the processor 200 may control the washing machine 1000 to perform an additional washing operation. To this end, the washing machine 1000 may store turbidity values of the washing water by dividing the values based on predetermined criteria. For example, the turbidity values may be stored by being divided into a plurality of levels zero to 5 according to an order of increasing the turbidity values of the washing water. That is, the turbidity values may be stored by being divided into the plurality of levels in inverse proportion to the magnitude of the electrical signals output from the sensor 100.

For example, in case that magnitude of the electrical signal output from the infrared wavelength is large, contamination of the washing water is not severe, and the turbidity value of the washing water may be stored corresponding to a lower level. In addition, in case that the magnitude of the electrical signal output from the infrared wavelength is small, a large number of particles having high turbidity may be included in the washing water. In other words, in case that the washing water is severely contaminated, the turbidity value of the washing water may be stored corresponding to a higher level. That is, if the magnitude of the electrical signal is converted to 1 to 5, magnitude 5 may be stored corresponding to level 1, and magnitude 4 may be stored corresponding to level 2.

In addition, in case that the washing machine 1000 has a predetermined level of 4 and detects an electrical signal having magnitude corresponding to a level higher than the level 4, it may be determined that the washing water is severely contaminated. That is, in case that the turbidity value of the washing water is equal to or greater than the turbidity value corresponding to level 4, the processor 200 may control the washing machine 1000 to perform the additional washing operation.

Meanwhile, the predetermined level may be set not only at the time at which a product is manufactured, but also by the user.

Referring to FIG. 7, the light receiver 120 may output an electrical signal having smaller magnitude than an electrical signal Vt, TH corresponding to a predetermined level in the infrared wavelength band. In this case, as the light receiver 120 outputs an electrical signal having magnitude corresponding to a level higher than the predetermined level, the processor 200 may determine that the contamination degree of the washing water is high.

In this case, the processor 200 may control the washing machine 1000 to perform the additional washing operation. Accordingly, the user may be provided with laundry completely washed.

Figure 8:
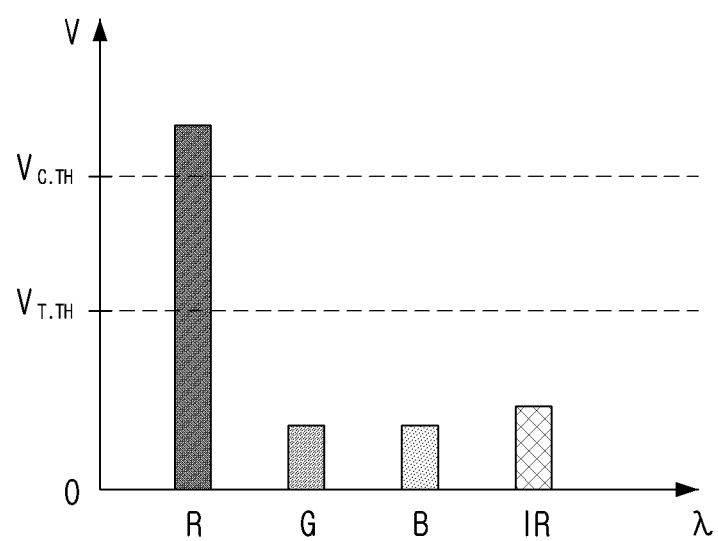
FIG. 8 is another view for describing that the washing machine is controlled to perform a dye transfer prevention operation.

FIG. 8 is another view for describing that the washing machine is controlled to perform a dye transfer prevention operation.

FIG. 8 shows an electrical signal output from the light receiver 120 in case that red-based dye transfer occurs in the washing water and the turbidity of the washing water is severe. In detail, in case that the red-based dye transfer occurs, the light receiver 120 may output the electrical signal having magnitude equal to or larger than magnitude corresponding to a predetermined level in a visible light region of the red wavelength band by red-based particles included in the washing water. In addition, the light receiver 120 may output an electrical signal having magnitude equal to or smaller than magnitude corresponding to the predetermined level by particles having a high turbidity included in the washing water.

Accordingly, the processor 200 may determine that the washing water has the color of the concentration grade equal to or higher than a predetermined grade in the red wavelength band and the turbidity value equal to or higher than the predetermined level in the infrared wavelength band.

In this case, the processor 200 may control the washing machine to perform the dye transfer prevention operation, rather than the additional washing operation. Accordingly, it is possible to prevent a large amount of laundry from being damaged by the dye transfer.

Meanwhile, the processor 200 may determine the turbidity and color of the washing water while the washing machine 1000 performs at least one of a preliminary washing operation or the washing operation. For example, in the preliminary washing operation, i.e. the laundry soaking operation, the processor 200 may determine the turbidity and color of the washing water and control the washing machine 1000 to perform either the additional washing operation or the dye transfer prevention operation. Alternatively, in the washing operation, the processor 200 may determine the turbidity and color of the washing water and control the washing machine 1000 to perform either the additional washing operation or the dye transfer prevention operation.

Figure 9:
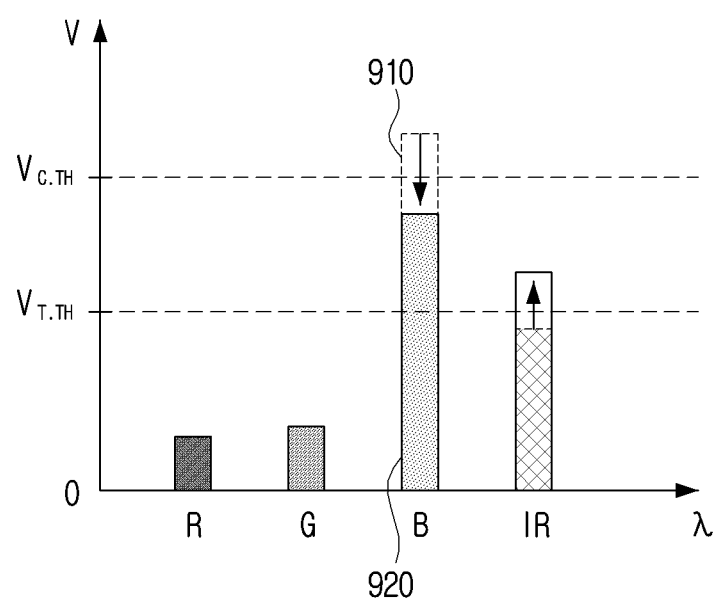
FIG. 9 is a view for describing that a operation of the washing machine is controlled in case that a detergent is put into the washing machine.

FIG. 9 is a view for describing that an operation of the washing machine is controlled in case that a detergent is put into the washing machine.

A detergent may have a different color and turbidity depending on a manufacturer. For example, a detergent having higher detergent power may have a darker color or turbidity than a detergent having lower detergent power.

Meanwhile, in case of using the detergent having the higher detergent power, even if the dye transfer does not occur, the washing machine 1000 may malfunction due to a color change of the washing water by the detergent. Accordingly, it is necessary to determine the turbidity and color of the washing water in consideration of the detergent put into the washing machine 1000.

To this end, in case that the detergent is put into the washing machine 1000, the processor 200 may determine the color and turbidity of the washing water in which the detergent is diluted, and control the operation of the washing machine 1000 based thereon. In detail, the processor 200 may determine the operation of the washing machine 1000 by compensating for the turbidity and color of the detergent to the turbidity and color of the washing water in which the detergent is diluted.

For example, referring to FIG. 9, in case that the light receiver 120 outputs an electrical signal 910 having a magnitude equal to or larger than the magnitude corresponding to a predetermined concentration grade in the blue wavelength band, the processor 200 may compensate for the color of the detergent to the output electrical signal, and determine whether the dye transfer occurs in the washing water based on a compensated electrical signal 920.

That is, as shown in FIG. 9, the light receiver 120 outputs the electrical signal having a magnitude equal to or larger than the magnitude corresponding to the predetermined concentration grade in the blue wavelength band by a blue-based detergent. However, the processor 200 may compensate for the color of the detergent to the output electrical signal, and may determine that the dye transfer does not occur in the washing water based on the compensated electrical signal 920.

Similarly, the processor 200 may compensate for the turbidity of the detergent to the electrical signal output from the light receiver 120 in the infrared wavelength band, and may determine the contamination degree of the washing water based on the compensated electrical signal.

That is, as shown in FIG. 9, due to the turbidity of the detergent, the light receiver 120 outputs the electrical signal having a magnitude equal to or smaller than the magnitude corresponding to a predetermined level in the infrared wavelength band. However, the processor 200 may compensate for the turbidity of the detergent to the output electrical signal, and may determine that the contamination degree of the washing water is not severe based on the compensated electrical signal.

Meanwhile, the above-described embodiments describe that, as an example, the magnitude of the electrical signal Vc, th corresponding to the predetermined grade related to the color is larger than the magnitude of the electrical signal Vt, th corresponding to the predetermined level related to the turbidity. However, this configuration is an embodiment. That is, Vc, th may be smaller than Vt, th or may be the same as Vt, th.

In addition, the above-described embodiments describe that, as an example, one Vc, th and one Vt, th are predetermined. However, a plurality of Vc, ths and a plurality of Vt, ths may be set, respectively. This configuration is described with reference to FIG. 10.

Figure 10:
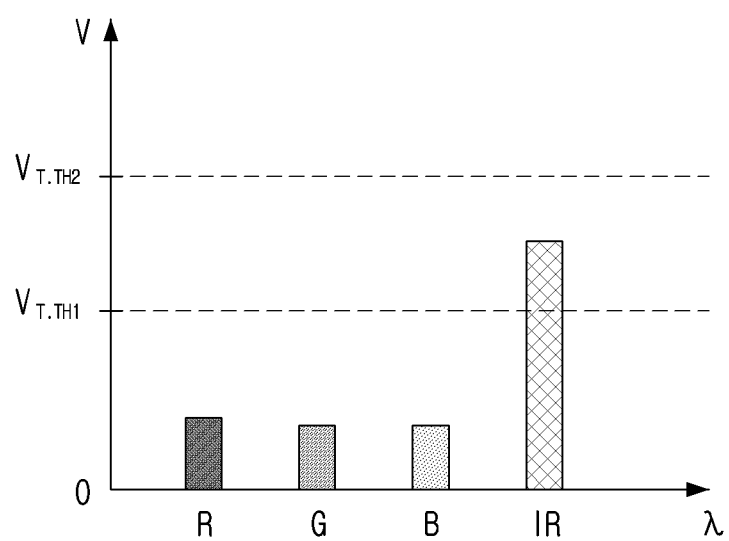
FIG. 10 is a view for describing that a turbidity value of washing water is determined based on a plurality of predetermined turbidity values, and the washing machine is controlled based thereon.

FIG. 10 is a view for describing that a turbidity value of washing water is determined based on a plurality of predetermined turbidity values, and the washing machine is controlled based thereon.

Referring to FIG. 10, there may be a plurality of predetermined levels set related to the turbidity value of the washing water. That is, there may be a plurality of magnitude Vt, th1 and Vt, th2 of the electrical signals corresponding to the predetermined levels related to the turbidity value of the washing water.

In this case, in determining the operation of the washing machine 1000 on the basis of the turbidity of the washing water, the processor 200 may determine the operation of the washing machine 1000 in consideration of: the magnitude of the electrical signal output from the light receiver 120; the magnitude Vt, th1 of the electrical signal corresponding to a first level; and the magnitude Vt, th2 of the electrical signal corresponding to a second level.

For example, as shown in FIG. 10, in case that the magnitude of the electrical signal output from the infrared wavelength is larger than Vt, th1 and smaller than Vt, th2, the processor 200 may determine that the contamination degree is not relatively severe, and control the washing machine 1000 to perform one additional washing operation.

On the contrary, in case that the magnitude of the output electrical signal output from the infrared wavelength is larger than Vt, th2, the processor 200 may determine that the contamination degree is relatively severe, and control the washing machine 1000 to perform two additional washing operations.

Meanwhile, it is only an embodiment to perform the additional washing operation on the basis of the turbidity value of the washing water, and the processor 200 may control the operation of the washing machine for washing the laundry in various ways such as to increase washing time.

Figure 11:
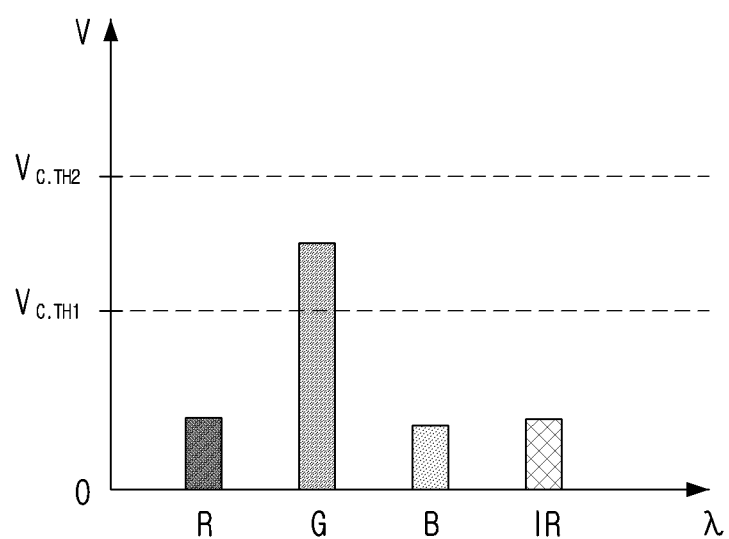
FIG. 11 is a view for describing that a color of washing water is determined based on a plurality of predetermined concentration grades, and the washing machine is controlled based thereon.

FIG. 11 is a view for describing that a color of washing water is determined based on a plurality of predetermined concentration grades, and the washing machine is controlled based thereon.

Referring to FIG. 11, there may be a plurality of predetermined levels set related to the color of the washing water. That is, there may be a plurality of magnitudes Vc, th1 and Vc, th2 of the electrical signals corresponding to the predetermined levels related to the color of the washing water.

In this case, in determining the operation of the washing machine 1000 based on the color of the washing water, the processor 200 may determine the operation of the washing machine 1000 in consideration of the magnitude of the electrical signal output from the light receiver 120, the magnitude Vc, th1 of the electrical signal corresponding to the first level and the magnitude Vc, th2 of the electrical signal corresponding to the second level.

For example, as shown in FIG. 11, in case that the magnitude of the electrical signal output from the visible wavelength is larger than Vc, th1 and smaller than Vc, th2, the processor 200 may determine that the discoloration degree of the laundry is not relatively severe, provide the user with a feedback on a risk of the occurrence of the dye transfer, and continue the washing operation. Here, the feedback on the risk of the occurrence of the dye transfer may be performed in various ways such as providing warning sound through the speaker of the washing machine.

On the contrary, in case that the magnitude of the electrical signal output from the visible wavelength is larger than Vc, th2, the processor 200 may determine that the discoloration degree of the laundry is relatively severe, provide the user with the feedback on the risk of the occurrence of the dye transfer, and may end the washing operation.

Meanwhile, the above-described embodiment is only an embodiment and based on sections to which the turbidity and color of the washing water belong, the processor 200 may control the washing machine in various ways.

Figure 12:
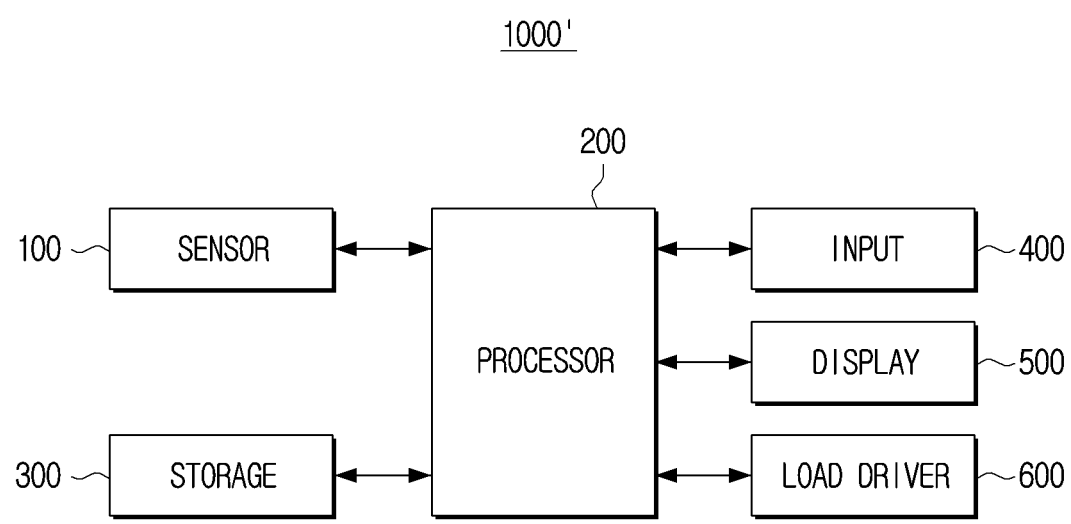
FIG. 12 is a detailed block diagram for describing a washing machine according to another embodiment of the disclosure.

FIG. 12 is a detailed block diagram for describing a washing machine according to another embodiment of the disclosure.

Referring to FIG. 12, a washing machine 1000' according to another embodiment of the disclosure may include the sensor 100, the processor 200, a storage 300, an input 400, a display 500 and a load driver 600. Hereinafter, portions overlapping the above description are omitted.

The storage 300 may store an operating system (OS) for controlling overall operations of components of the washing machine 1000' and instructions or data related to the components of the washing machine 1000'.

Accordingly, the processor 200 may control a plurality of hardware or software components of the washing machine 1000' using various instructions or data stored in the storage 300, load and process instructions or data received from at least one of the other components in a volatile memory, and store various data in a nonvolatile memory.

Meanwhile, the processor 200 may determine turbidity value and color of rinsing water while the washing machine 1000' performs a rinsing operation. In addition, in case that the processor 200 determines that at least one of the turbidity value and color of the rinsing water is equal to or higher than a predetermined level, the processor 200 may control the washing machine 1000' to perform an additional rinsing operation.

Here, the determination of the turbidity and color of the rinsing water and the performance of the additional rinsing operation may use the same art as the above-described art for determining the turbidity and color of the washing water.

The storage 300 may store the washing operation corresponding to the intensity and patterns of the visible and infrared light as a table. In detail, the storage 300 may divide the visible and infrared light of the specific wavelengths, which are received by the light receiver 120, into a plurality of levels based on the magnitude of the electrical signal output from the light receiver 120, and may store the operation of the washing machine 1000' by matching the operation of the washing machine 1000' to the specific wavelength and the specific level.

For example, the storage 300 may divide the light corresponding to the red wavelength band among the visible wavelengths into a plurality of levels, and may store the dye transfer prevention operation by matching the dye transfer prevention operation to a section having a level equal to or higher than the predetermined level among the plurality of levels. In addition, the storage 300 may divide the light corresponding to the infrared light into a plurality of levels, and may store the additional washing operation by matching the additional washing operation to a section having a level equal to or higher than the predetermined level among the plurality of levels.

Accordingly, the processor 200 may compare the wavelength and magnitude of the electrical signal output from the light receiver 120 with the table stored in the storage 300, determine the operation of the washing machine corresponding to the wavelength and the magnitude of the electrical signal output from the light receiver 120, and control the operation of the washing machine 1000' based thereon.

The input 400 may receive various user instructions. For example, the input 400 may be implemented in a form of a button on a main body of the washing machine 1000', and may receive an input such as power on or off, start or end of the washing operation.

The display 500 may display various images. For example, the display 500 may display a message indicating that the dye transfer occurs in case that the dye transfer occurs, and may display a message indicating that the additional washing operation is performed in case that the additional washing operation is performed.

The load driver 600 may control driving of a load such as a motor (not shown), a heater (not shown), a pump (not shown) or the like. In detail, the load driver 600 may drive the motor (not shown) in case of receiving a washing operation instruction, drive the heater (not shown) in case of receiving a dehydration instruction and drive the pump (not shown) in case of receiving a rinsing instruction.

Meanwhile, although not shown in FIG. 12, the load driver 600 may further include the speaker (not shown). The speaker (not shown) may output audio indicating that the dye transfer occurs in case that the dye transfer occurs, and output audio indicating that the additional washing operation is performed in case that the additional washing operation is performed.

Figure 13:
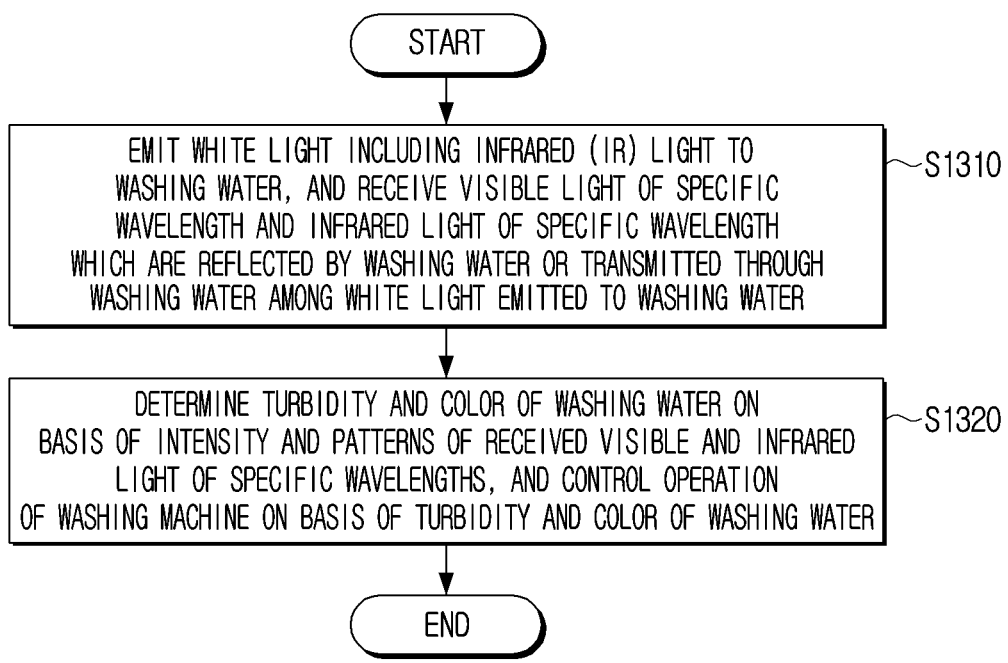
FIG. 13 is a view for describing an operation flowchart of a washing machine according to an embodiment of the disclosure.

FIG. 13 is a view for describing an operation flowchart of a washing machine according to an embodiment of the disclosure.

The washing machine may emit white light including infrared (IR) light to washing water, and receive visible light of a specific wavelength and infrared light of a specific wavelength, which are reflected by the washing water or transmitted through the washing water, among the white light emitted to the washing water (S1310).

Here, the washing machine may simultaneously receive the visible light of the specific wavelength and the infrared light of the specific wavelength, among the white light emitted to the washing water. That is, the washing machine may simultaneously receive the visible and infrared light of the specific wavelengths and perform a multi-wave detection.

In addition, the washing machine may determine turbidity and color of the washing water based on intensity and patterns of the received visible and infrared light of the specific wavelengths, and control an operation of the washing machine based on the turbidity and color of the washing water (S1320).

In detail, the washing machine may determine color and concentration grade of the washing water on the basis of the intensity and pattern of the received visible light of the specific wavelength, and perform a dye transfer prevention operation in case that the color of the washing water has a grade equal to or higher than a predetermined concentration grade.

Here, the dye transfer prevention operation may be at least one of: an operation for providing feedback on occurrence of dye transfer to the user; an operation for preventing spread of the dye transfer; or an operation for ending a washing operation.

In addition, the washing machine may determine a turbidity value of the washing water on the basis of the intensity and patterns of the received visible and infrared light of the specific wavelengths, and may perform an additional washing operation in case that the turbidity value of the washing water is equal to or higher than a predetermined level.

Meanwhile, the washing machine may determine the turbidity and color of the washing water while the washing machine performs at least one of a preliminary washing operation or the washing operation.

Meanwhile, in case that a detergent is put into the washing machine, the washing machine may determine the color and turbidity of the washing water in which the detergent is diluted, and control the operation of the washing machine on the basis of the turbidity and color of the washing water in which the detergent is diluted.

In addition, the washing machine may determine turbidity and color of rinsing water while a rinsing operation is performed, and control the washing machine to perform an additional rinsing operation on the basis of the turbidity and color of the rinsing water.

Meanwhile, there may be provided a non-transitory computer readable medium storing a program sequentially performing a method of controlling an electronic device according to the disclosure.

The non-transitory computer-readable medium is not a medium that temporarily stores data therein, such as a register, a cache, a memory or the like, but a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a blu-ray disk, a universal serial bus (USB), a memory card, a read only memory (ROM) or the like.

Although the embodiments of the disclosure are illustrated and described hereinabove, the disclosure is not limited to the specific embodiments described above, but may be variously modified by those skilled in the art to which the disclosure pertains without departing from the scope and spirit of the disclosure as claimed in the claims. These modifications also need to be understood to fall within the technical spirit and scope of the disclosure.

INDUSTRIAL APPLICABILITY

[Free Text of Sequence List]

The invention claimed is:
1. A washing machine comprising:
a light emitter configured to emit white light including infrared (IR) light to washing water;
a light receiver configured to receive visible light and infrared light which are reflected by the washing water or transmitted through the washing water among the white light emitted to the washing water; and
a processor configured to determine a turbidity value of the washing water and a color of the washing water based on intensity and patterns of the received visible light and the received infrared light, and control an operation of the washing machine based on the determined turbidity value of the washing water and the determined color of the washing water,
wherein the light receiver includes a plurality of layers, the plurality of layers includes a first layer configured to receive a first color of the visible light corresponding to a first wavelength band, a second layer configured to receive a second color of the visible light corresponding to a second wavelength band, a third layer configured to receive a third color of the visible light corre- sponding to a third wavelength band, and a fourth layer configured to receive the infrared light of an infrared wavelength band, and wherein the processor is configured to:

after a detergent is put into the washing machine, determine a first turbidity value of the washing water in which the detergent is diluted based on intensity and pattern of at least one visible light among visible light of the first wavelength, visible light of the second wavelength and visible light of the third wavelength received from the light receiver in a pre-washing operation, determine a second turbidity value of the washing water based on intensity and pattern of visible light of the first wavelength, visible light of the second wavelength, visible light of the third wavelength received from the light receiver in a pre-washing operation, and the infrared light in a washing operation, determine a third turbidity value corresponding the washing water by calibrating the second turbidity value as the first turbidity value, and control to perform an additional washing operation based on the third turbidity value corresponding washing water.

2. The washing machine of claim 1, wherein the processor is configured to determine the color of the washing water and a concentration grade of the color of the washing water based on the intensity and pattern of the received visible light, and control the washing machine to perform a dye transfer prevention operation when the processor determines that the determined concentration grade of the color is equal to or higher than a predetermined concentration grade of the color.

3. The washing machine of claim 2, wherein the dye transfer prevention operation is one or more of an operation provided feedback on occurrence of dye transfer to a user, an operation to prevent spread of the dye transfer from the spreading out, and an operation end a washing operation.

4. The washing machine of claim 1, wherein the processor is further configured to determine the turbidity value of the washing water based on the intensity and patterns of the received visible light and the received infrared light and control the washing machine to perform an additional washing operation when the processor is configured to determine that the turbidity value of the washing water is equal to or greater than a predetermined turbidity value.

5. The washing machine of claim 1, wherein the processor is configured to determine the turbidity value, the color, and a concentration grade of the washing water while the washing machine is performing one or more of a preliminary washing operation and the washing operation.

6. The washing machine of claim 1, wherein the processor is further configured to determine the turbidity and the color of rinsing water while a rinsing operation is performing, and control the washing machine to perform an additional rinsing operation based on the determined turbidity and the determined color of the rinsing water.

7. The washing machine of claim 1, wherein the light receiver is configured to simultaneously receive the visible light and the infrared light, and perform a multi-wave detection.

8. The washing machine of claim 1, wherein the first color of the visible light is red color and the first wavelength band is a red wavelength band, the second color of the visible light is green color and the second wavelength band is a green wavelength band, and the third color of the visible light is blue color and the third wavelength band is a blue wavelength band.

9. The washing machine of claim 8, wherein the plurality of layers further includes an infrared light layer configured to receive the infrared light of the specific wavelength.

* * * * *